United States Patent
Farkash et al.

(10) Patent No.: US 8,332,417 B2
(45) Date of Patent: Dec. 11, 2012

(54) METHOD AND SYSTEM FOR SEARCHING USING CONTEXTUAL DATA

(75) Inventors: Ariel Farkash, Haifa (IL); Ohad Greenshpan, Haifa (IL); Ksenya Kveler, Haifa (IL); Dafna Sheinwald, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 12/494,302

(22) Filed: Jun. 30, 2009

(65) Prior Publication Data

US 2010/0332470 A1    Dec. 30, 2010

(51) Int. Cl.
G06F 15/16 (2006.01)
G06F 17/20 (2006.01)

(52) U.S. Cl. ........... 707/756; 707/760

(58) Field of Classification Search ........... 707/756, 707/760
See application file for complete search history.

(56) References Cited

U.S. PATENT DOCUMENTS

| | | | |
|---|---|---|---|
| 6,338,059 B1 | 1/2002 | Fields et al. | |
| 6,778,979 B2 | 8/2004 | Grefenstette et al. | |
| 6,785,670 B1 | 8/2004 | Chiang et al. | |
| 6,826,553 B1 * | 11/2004 | DaCosta et al. | 1/1 |
| 2002/0073079 A1 * | 6/2002 | Terheggen | 707/3 |
| 2002/0116371 A1 * | 8/2002 | Dodds et al. | 707/3 |
| 2003/0126134 A1 * | 7/2003 | Messing et al. | 707/10 |
| 2007/0168382 A1 * | 7/2007 | Tillberg et al. | 707/102 |

OTHER PUBLICATIONS

Schilit et al, Beyond Paper: Supporting Active Reading with Free Form Digital Ink Annotations; pp. 249-256; Published 1998.*
X-sights Demo http://www.xsights.com/xsights/demo.html.

* cited by examiner

*Primary Examiner* — Jean M Corrielus
*Assistant Examiner* — Alex Gofman

(57) ABSTRACT

A method and system for searching using contextual data are provided. The method includes receiving one or more areas of data captured by a user from a display, the data including content and context or structure. The method converts the area of captured data to one or more extensible markup language (XML) representations of the content and context or structure. The method provides multiple hierarchical textual instances with formatting (for example, as hypertext markup language instances) corresponding to the XML representations. A query is generated for searching in a search engine for each textual instance. The one or more areas of data captured by a user include an indication of whether the area of data is selected for content, context, or both.

23 Claims, 5 Drawing Sheets

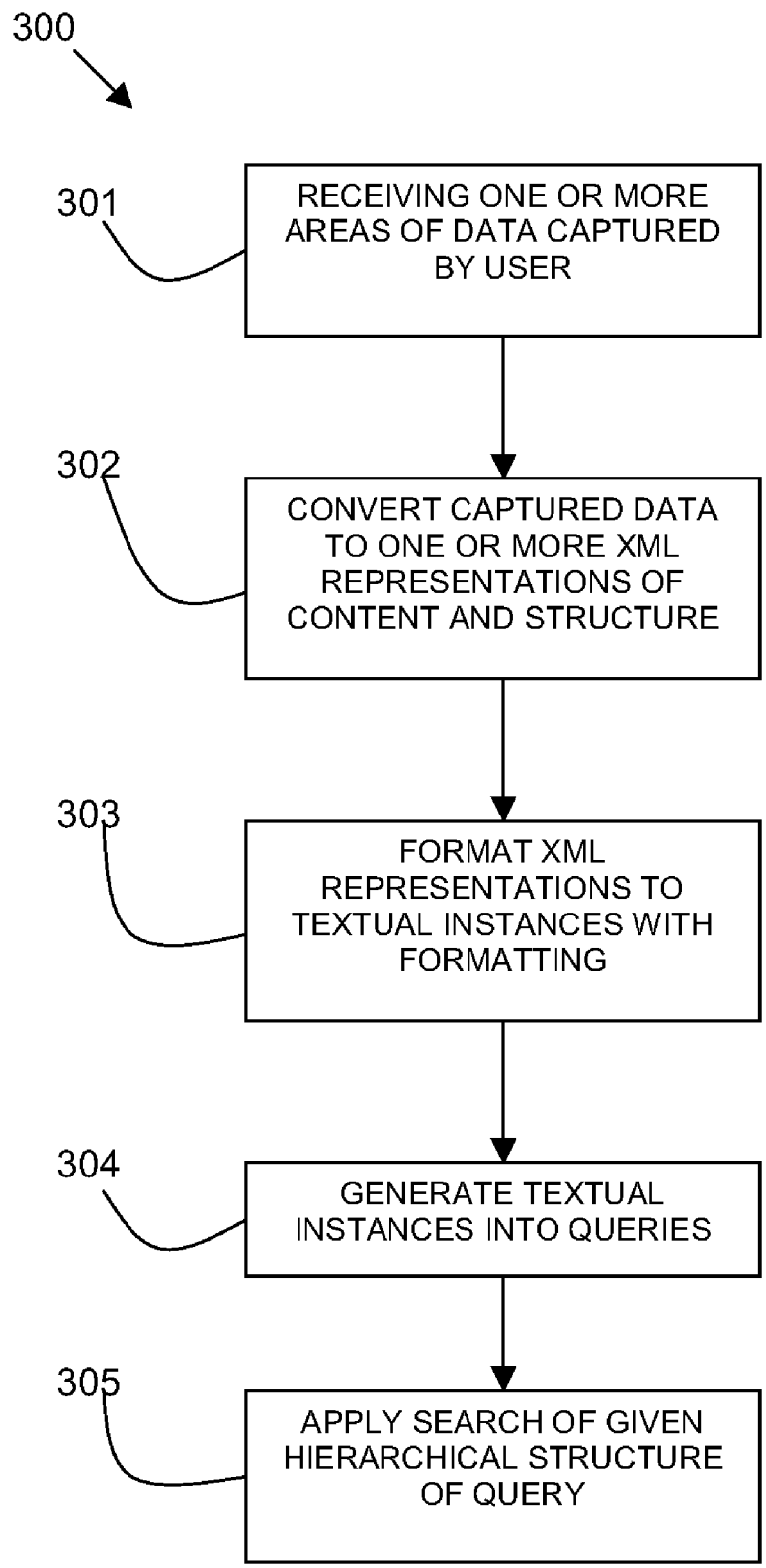

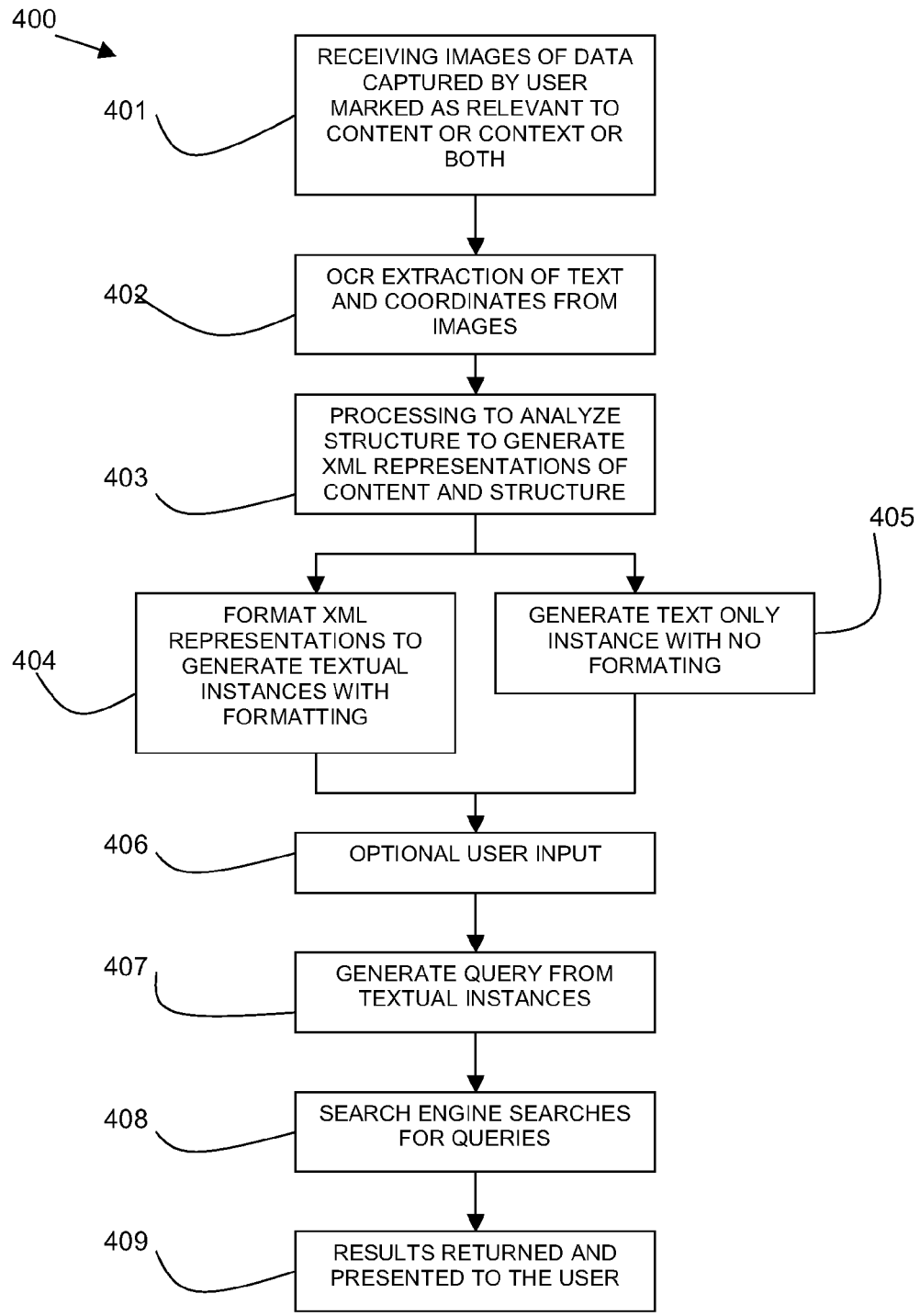

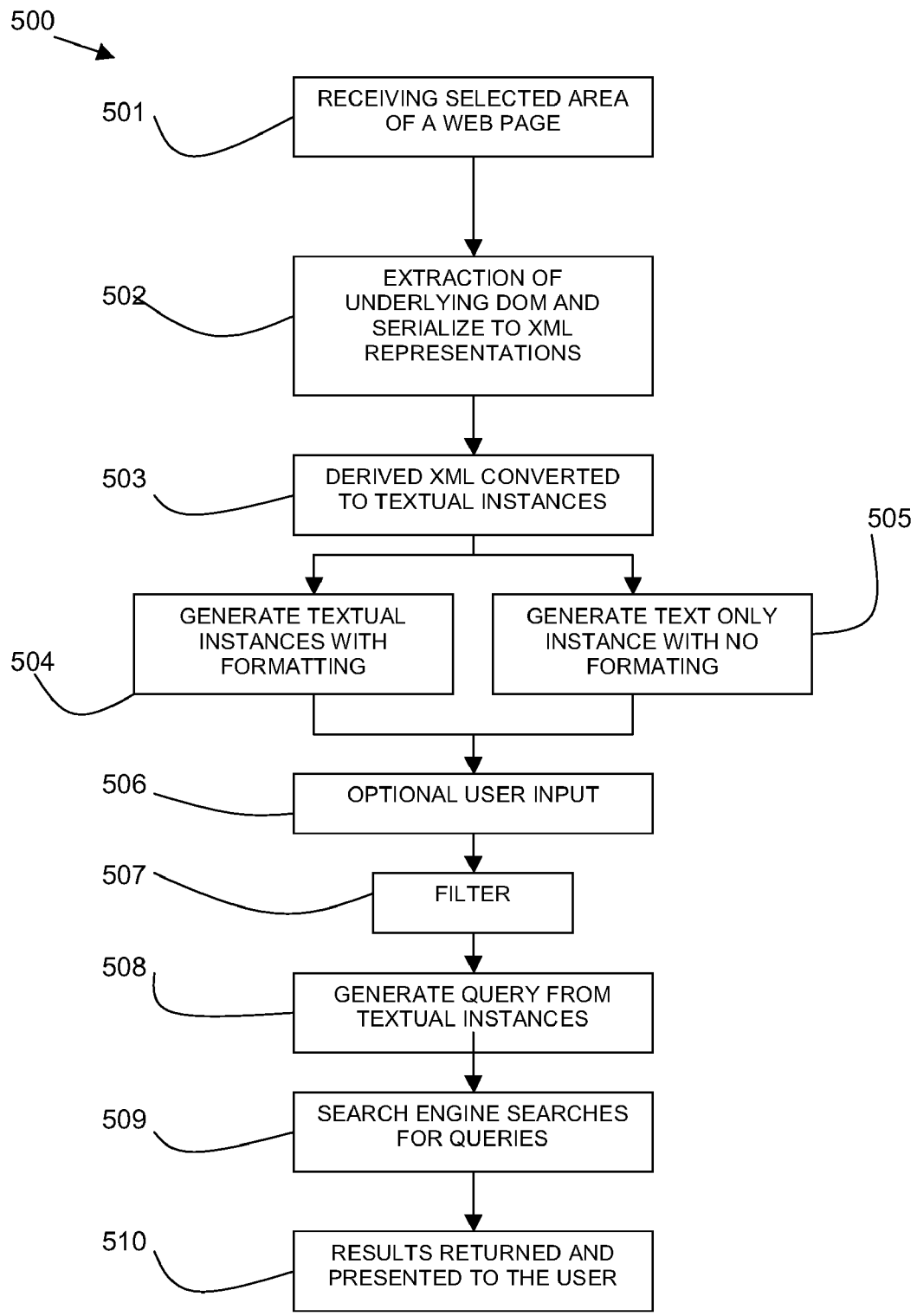

METHOD AND SYSTEM FOR SEARCHING USING CONTEXTUAL DATA

FIELD OF THE INVENTION

This invention relates to the field of searching for information. In particular, the invention relates to searching for data using contextual data.

BACKGROUND OF THE INVENTION

Currently, in navigation between pages on the web, a user encounters a large amount of data. There are many cases in which the user would like to generate queries for further searching based on the data she captures during this navigation.

Current methods enable either a "copy and paste" action to send copied data to a search engine or text highlighting and sending to search via mouse right-click. Neither of these methods preserves the structure or context of the data being captured.

An example is a case where the user captures a portion of a table and would like to search for a similar portion being available on the web, i.e. an element that appears in a table context.

Assume a user looks at a table/figure that lists laboratory results, as follows:

| Measure | Value |
|---------|-------|
| measure1 | High |
| measure2 | Low |
| measure3 | 5 |
| measure4 | Average |
| measure5 | 33 mmHg |

A search request which does not take context into account would search for instances with the relevant words (measure1, measure2 . . . , High, Low, . . . ).

In order to enable the user to retrieve similar instances, the context which associates "measure1" with the value "High", "measure2" with the value "Low", etc. is needed.

There are cases in which the data to be searched does not have available HTML (HyperText Markup Language) source (for example, Adobe Flex-based applications (Adobe and Adobe Flex are trade marks of Adobe Systems Inc.). There are also cases in which the user cannot easily select the text in the page, for example, if text is part of an image.

There are other cases in which the HTML source is available, such as in a web browser viewing a simple HTML web page, and similar HTML instances need to be found that were indexed on the web.

SUMMARY OF THE INVENTION

According to a first aspect of the present invention there is provided a computer-implemented method for searching using contextual data, comprising: receiving one or more areas of data captured by a user from a display, the data including content and context or structure; converting the area of captured data to one or more extensible markup language (XML) representations of the content and context or structure; providing hierarchical textual instances with formatting corresponding to the XML representations; and generating a query for searching in a search engine for each textual instance; wherein any of said steps are implemented in either of computer hardware or computer software and embodied in a computer-readable medium.

According to a second aspect of the present invention there is provided a computer program product for searching using contextual data, the computer program product comprising: a computer readable medium; computer program instructions operative to: receive one or more areas of data captured by a user from a display, the data including content and context or structure; convert the area of captured data to one or more extensible markup language (XML) representations of the content and context or structure; provide hierarchical textual instances with formatting corresponding to the XML representations; generate a query for searching in a search engine for each textual instance; wherein said program instructions are stored on said computer readable medium.

According to a third aspect of the present invention there is provided a system for searching using contextual data, comprising: a processor; a receiver for receiving one or more areas of data captured by a user from a display, the data including content and context or structure; a converter for converting the area of captured data to one or more extensible markup language (XML) representations of the content and context or structure; a formatter for providing hierarchical textual instances with formatting corresponding to the XML representations; and a query generator for generating a query for searching in a search engine for each textual instance; wherein any of said receiver, converter, formatter and query generator are implemented in either of computer hardware or computer software and embodied in a computer readable medium.

The described method and system aim to assist a user to generate a query based on data she sees on her screen in a way that not only the content (words, etc.) but also the context or the structure (the way it is being organized on the screen) is preserved.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3 is a flow diagram of a method in accordance with the present invention;

FIG. 4 is a flow diagram of a method of a first embodiment of the present invention; and FIG. 5 is a flow diagram of a method in accordance with a second embodiment of the present invention.

Figure 1:
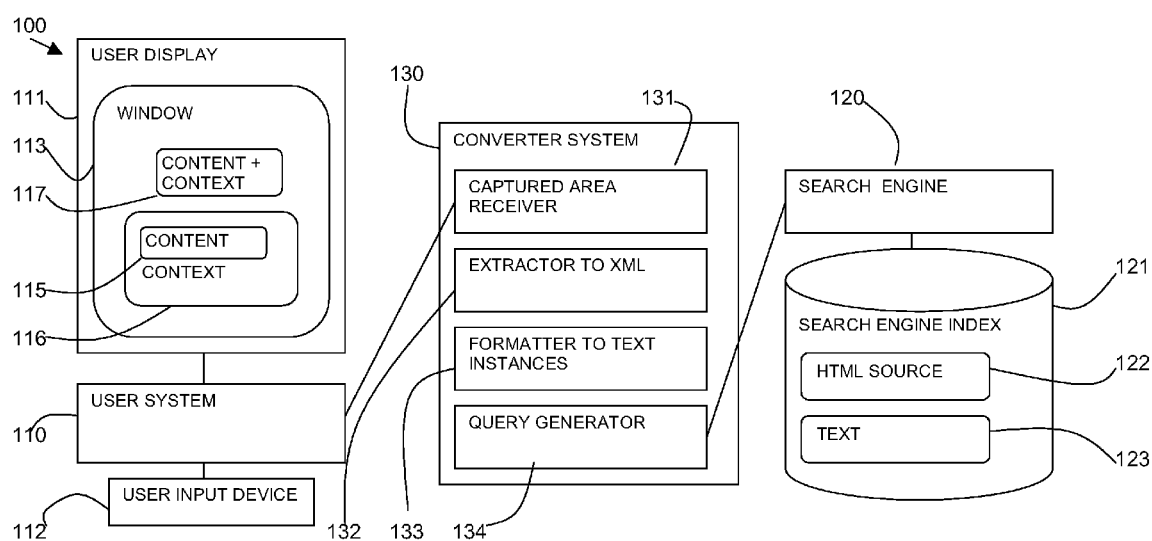
FIG. 1 is a block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described which enable a user to generate a query based on data she sees on her screen in a way that preserves not only the content such as the text, words, numbers, etc. but also the context or the structure which shows how the content is presented on the screen. For example, "bread and butter" appearing in a sentence will likely have a different meaning then "bread" and "butter" appearing in two rows of a table. One will be a common phrase, while the other might be a part of recipe.

In the described method and system, queries are generated which are based on multiple instances of formatted content. Some of the instances may only include the content with no formatting.

XML (Extensible Markup Language) is a general purpose specification for creating custom markup languages. HTML is the predominant markup language for web pages. It provides a means to describe the structure of text-based information in a document such as a web page. The Extensible Hypertext Markup Language (XHTML) is a markup language that has the same depth of expression as HTML but also conforms to the XML syntax. XHTML can be thought of as the intersection of HTML and XML since it is a reformulation of HTML in XML.

The HTML source of data on the web is stored and indexed by search engines. Search engines are able to index hierarchical structures of documents along with the text words of these documents. The search engines are therefore able to process queries that express twigs or branches of the hierarchical structure.

Tools like OmniFind the enterprise search engine of IBM (OmniFind and IBM are trade marks of International Business Machines Corporation) search for stored XML instances. HTML instances are stored in the same way as XML.

Therefore, it is assumed that data being captured in the described method and system (which includes data content, or data context, or both) has HTML source stored and indexed by search engines. HTML instances are generated from the captured data for searching. In case this assumption does not hold, a non-HTML instance is also generated which contains only the words (without the tags and context), to catch instances that indexed the content only.

If the data being captured from a screen by the user has no available textual source (for example, in the case of images, or where a user cannot select the text, or other content where HTML source is not available), a reverse-engineering method is provided that will guess how this source would appear. Similar HTML instances can then be found which have been indexed on the web.

In other circumstances, HTML source is available for data being captured, such as in a web browser viewing a simple HTML web page. The described method finds similar HTML instances that have been indexed on the web.

A user may capture data she is viewing on a screen. This may be by capturing a portion of a screen, which may be a web page, document, or any other viewable window. A user may select a single area with content and context, or may select the content and context separately.

If the content and context are selected separately, this decouples the need to capture structure and content together. For example, when looking at blood test results, wanting to find reports with a specific measurement (e.g. for Hemoglobin), one may mark the whole report in order to define the structure for the query and mark a Hemoglobin test to define important content.

Referring to FIG. 1, a block diagram shows an architecture 100 including a user system 110 with a user display 111 and a user input device 112 such as a mouse or other pointer device capable of selecting an area on a window 113 of the user display 111. A user selects one or more areas 115-117 on the user display 111 and can specify that he is selecting content 115 from an area, or the context or structure 116 from an area, or both 117.

A search engine 120 is shown as known in the art with a search engine index 121 which stores and indexes HTML source 122 and text 123 of documents available via the Internet or other forms of network, such as enterprise intranets.

A converter system 130 is provided for converting captured data from the one or more selected areas 114 of the user display 111 to queries for searching in a search engine index 121. The converter system 130 may be provided via a network such as the internet.

The converter system 130 includes a captured area receiver 131, an extractor 132 to XML, a formatter 133 to hierarchical text instances, and a query generator 134. The functions of these components are explained further below and two different embodiments are described illustrating examples.

Figure 2:
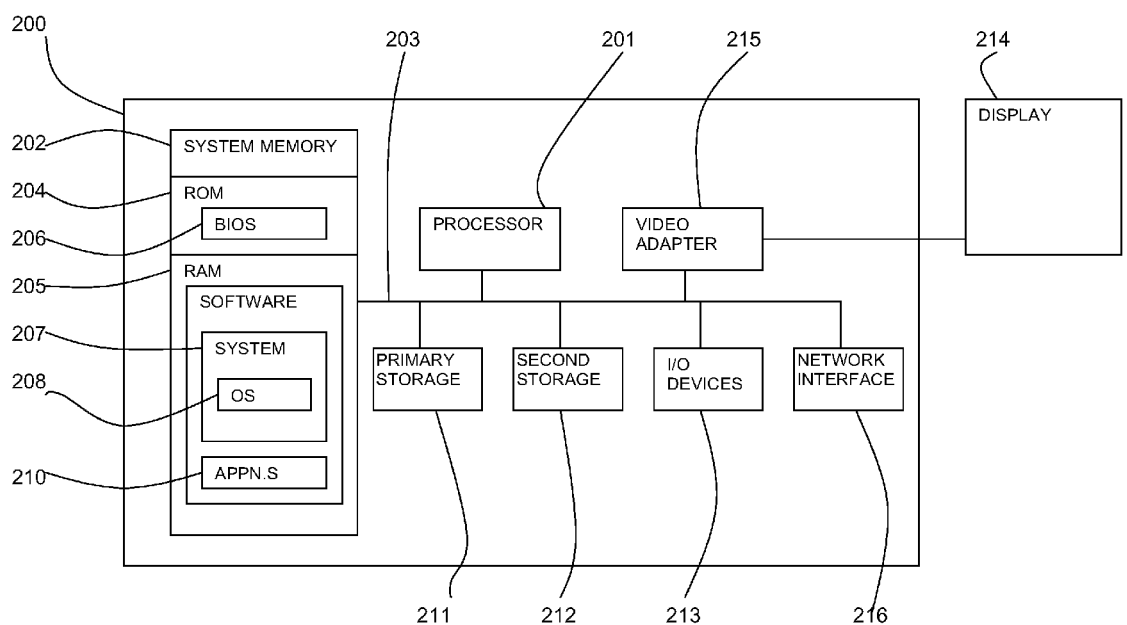
FIG. 2 is a block diagram of a computer system in which the present invention may be implemented.

Referring to FIG. 2, an exemplary system for implementing the user system, the converter system, and a search engine includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows the described method. As a first step, a system receives 301 one or more areas of data captured by a user. The data includes content such as text, numbers, etc. and context or structure such as a table or figure. The capture may include specifying an area for which the content is selected, and specifying an area for which the context is selected, or specifying an area for which both content and context are selected. An example for a user interface would be marking two boxes:

A blue box for selecting content

A green box for selecting context

If no green box was selected, the blue box serves for both content and context.

The captured data is then converted 302 to result in one or more XML representations of the captured data including some logical structure and content representation.

The conversion to XML representations may be carried out, in one embodiment by OCR (Optical Character Recognition) of the captured area with additional structural analysis, or in another embodiment, by DOM (Document Object Model) extraction. If an OCR process of the captured data is carried out, there may be more than one snippet of XML produced in order to create a comprehensive representation of the captured data. If HTML source is available in XHTML format is can serve as the XML input.

The XML representations are then formatted 303 to a query format in the form of hierarchical textual instances corresponding to the XML representations. This is a prediction of what the HTML source would look like for the structured content. This involves a translation from logical terms to HTML tags. The textual instances can include formatting information such as tags in HTML source. Additional textual instances may not include formatting and may be provided to a search engine as is, without XML fragments. Pure textual instances may be retrieved using techniques such as bag-of-words which ignores prepositions and irrelevant words (such as "a", "an", etc.)

There is an optional user input at this stage to allow additional working to the formatted query to focus the query further. This may include the addition of content and/or formatting.

The textual instances with formatting are then generated 304 into an XML query for submitting to a search engine. The search is applied 305 using the hierarchical structure of the query to search for indexed hierarchical source.

Search engines that index hierarchical structures of documents, along with the text words of these documents, can process queries that express twigs. For example, IBM's OmniFind enterprise search engine expresses twigs using the XMLFragment query language. Such search engines can retrieve documents whose DOM structure includes the query twig as a subtree, inclusion that respects the above mentioned configuration. Moreover, such search engines can retrieve documents that satisfy several constraints, one of which is the inclusion of the twig query. Hence, such search engines would be able to retrieve documents that include the twig query AND the potential additional contextual manually words added by the user.

In structured information, common techniques, such as extraction of "bag of words" are not sufficient since the structure of the data needs to be known in order to retrieve pages that look alike, with the same structure and context (papers containing only the same words would not be as good).

Sometimes there is no available HTML source for websites, and it is desired to search for indexed HTML pages on the web. It is then necessary to predict how a given page on which OCR has been performed and words extracted, would look as if the HTML source were available.

Similarly, if there is available HTML source, it may also be desirable to predict how similarly formatted information may be provided.

An example of the HTML source prediction method is as follows:

Assume that the following figure is being captured by the user:

```
test      hemoglobin
value     9.2
```

In order to find the HTML source that would produce the abovementioned example, the system would have to come up with possible predictions for HTML source fragments that would be suitable. The following are examples of such predictions which could be searched for in the search engine once they are generated. All of them preserve the context that appears in the abovementioned example.

Prediction 1:

```
<ul>
<li>test hemoglobin</li>
<li>value 9.2</li>
</ul>
```

This will be compiled as the following:

test hemoglobin value 9.2

Prediction 2:

```
<ul>
<li type=square>test hemoglobin</li>
<li type=square>value 9.2</li>
</ul>
```

This will be compiled as the following:

test hemoglobin value 9.2

Prediction 3:

```
<ul>
<li type=circle>test hemoglobin</li>
<li type=circle>value 9.2</li>
</ul>
```

This will be compiled as the following:

test hemoglobin value 9.2

Prediction 4:

```
<table border="1">
<tr>
<td>test</td>
<td>hemoglobin</td>
</tr>
<tr>
<td>value</td>
<td>9.2</td>
</tr>
</table>
```

This will be compiled as the following:

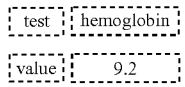

Once the textual instances have been formed, they are made into an XML query. If the query is compact, the search engine may generate all possible HTML options of what the data would look like. Alternatively, the query may contain all options and send them to the search engine one by one. In the example, the query is made explicit, such that the search engine knows exactly what HTML it should look for.

For example, an end query may take the form (based on prediction 4 described above):

```
<query>
    <table border="1">
    <tr>
    <td>test</td>
    <td>hemoglobin</td>
    </tr>
    <tr>
    <td>value</td>
    <td>9.2</td>
    </tr>
    </table>
</query>
```

There are search engines that can index laboratory examinations as XML documents, and then search over them, and retrieve all the documents that include occurrences of such a cell, independently of within which context they occur.

If the query is extended to read:

```
<lab-exams>
  <suspicious finding>
  extreme fatigue
  </suspicious finding>
  <cell>
    <test>
      hemoglobin
    </test>
    <value>
      9.2
    </value>
  </cell>
</lab-exams>
```

Only documents that include an occurrence of this low level hemoglobin in the context of extreme fatigue will be retrieved.

The search engine can be adjusted to retrieve all occurrences of that low hemoglobin (as before) but rank higher those documents that include that cell in the context of extreme fatigue. The engine can even be tuned to return all the neighboring cells within same <lab-exams>, where a user will be able to read the value of white blood cells (WBC), for example, and others.

The search engine query is to be generated automatically by a mechanism and a human user will probably not get to see it. In one embodiment, the automatic generation may be split into two: the general framework (for example, partition into cells of a table) and then, depending on the specific format of the underlying data (for example, no HTML, only XML, or HTML but without any table, etc.), the attributes, which may be OR-ed. Alternatively, at indexing time, the specifics of the underlying format will allow the index to only include the general framework, and so the generated query to search over such an index will only need to include that general framework, and not the specific attributes.

Two embodiments of the system and method are now described.

In a first embodiment, a case where HTML source is not available and/or the user cannot easily select the text in the page. A mechanism is used to find similar HTML instances indexed on the web.

A system of the first embodiment is provided for generating a query from an area captured on a user's display. The system includes a captured area receiver in the form of a service which enables a user to mark squares on the screen to define regions from which he would like to generate a query.

The extractor to XML includes an OCR module. The OCR module gets as an input the images being captured by the captured area receiver, and performs an OCR operation on them to extract text from the image and coordinates. The extractor to XML also processes the OCR output to guess the structure and outputs it as one or more XML representations.

A formatter is in the form of a query formatter module which generates a textual representation of the XML representations. The query formatter preserves content (the words being captured) and context (structure in which the words are being organized). The query generator then builds a query for a search engine.

The method of the first embodiment includes:

The user capturing a portion of the screen.

The data captured from the screen being passed to an extractor to XML, including an OCR module which extracts words and a processing mechanism for structural analysis, and generates an XML out of it.

This XML is passed to the query formatter module that predicts indexed HTML source instances and generates a set of (one or more) textual XML instances that might suit this captured screen portion. Optional user input may be made to the textual instances.

The set of textual instances (either XML or bag-of-words) is passed to the query generator that prepares a search query which will be passed to the search engine to find similar instances. The search engine should have the ability to search for XML twigs.

The results are presented on the screen.

Referring to FIG. 4, a flow diagram 400 shows an implementation of the method of the first embodiment in more detail.

A user sees content on the screen that she would like to query for and the user marks on the screen regions that contain the data she would like to query on. The marking is done by drawing one or more boxes on the screen and indicating if a box relates to content or context or both. The drawn boxes generate images which are received 401 at a system for conversion to queries.

The images are received and sent to an extractor to XML including an OCR module that extracts 402 words and coordinates from the images for which content has been indicated and a process mechanism for structural analysis 403 to generate an XML that contains the words being extracted and organized to match the way the data is organized on the screen from images for which context has been indicated (e.g., consecutive rows in a table will be consecutive elements in the XML).

A query formatter generates 404 a set of textual representation (structured HTML or unstructured bag-of-words)

instances of the OCR-generated XMLs. The user can provide 406 hints on the data being captured and contribute to the accuracy of the generated instances (e.g., assist in identification of tables, columns, etc.).

Since there is no source available, there is a need to produce all possible trees that might match indexed instances on the web. For example: elements that appear one below the other on the screen, will appear with appropriate coordinates after the OCR process. The XML representations after the structural analysis will include some logical representation of the structure in terms of tables, row, column. The formatting stage is then translation from that logical terms to the HTML tags (<table>, <tr> and etc) Providing all possible HTML wrapping tags, maximizes the probability to find the right match for it (e.g., <TR><TD> tags, <LI> tag, etc.).

In addition to these generated HTML instances, a pure text instance is generated 405 as well and contains only the words being captured in order to maximize the probability of a relevant instance being found (for example, even if the HTML tags were not indexed by the indexer). Of course, a matching of an XML twig (or fragment) will usually get a higher score than a simple text match, since it represents a better contextual match. Again, optional user input 406 can be added at this stage to refine the text.

The query generator module then generates 407 a query from the set of instances. The search engine searches 408 for pages/documents which contain or are similar to one of the instances and the result pages/documents are presented 409 to the user.

When using OCR processing a first stage is extracting from the data basic text with coordinates of detected phrases together with additional information, such as colours. OCR may detect whole phrases (words that are located close to each other) and not just separate words. For example, OCR XML result can be

```
<phrase color="0x0000ff">
  <rect x="75" y="173" w="70" h="10" />
  Blood Count
</phrase>
```

This is just the result of the OCR module. Analysis is then performed on top of this first extraction to try and detect structures, e.g. tables, table heading, table rows, table columns using OCR results (e.g. inspecting indentation). As a result, XML representations are generated including some logical structure and content representation (for example, <table><row><cell> . . . ). No coordinates or locations are then, but the order is preserved.

For example,

```
<a>
 <b>
  <c>
   ....
  </c>
 </b>
<a>
```

Is different from:

```
<a>
 <b>
  ...
 </b>
 <c></c>
</a>
```

Notice c is located differently in each of the above, which will impact the results of the query. Therefore, the order or location of elements is included in the XML representations.

In a second embodiment, HTML source for a captured data is available.

The system of the second embodiment includes a mechanism for selecting a region on a web page displayed on a user's screen. The mechanism enables the user to mark boxes on the screen to define regions from which he would like to generate a query.

The extractor to XML is provided in the form of a module for extraction of a DOM tree from the selected box using the algorithm described below. The DOM is serialized to its HTML representation, as valid XHTML format, thus in XML. That XML serves as basis for the contextual search.

The Document Object Model (DOM) is a cross-platform and language-independent convention for representing and interacting with objects in HTML, XHTML and XML documents. Objects under the DOM may be specified and addressed according to the syntax and rules of the programming language used to manipulate them.

The query formatter builds a user friendly, easy to understand, query based on the XML created from the source DOM. This clarifies which implicit semantic relationships were used. The query formatter may include a bag-of-words filter to purify the set of words being sent to generate the query.

The query generator builds an effective query for a search engine based on the formatted query. This includes explicitly defining all semantic relationships in an exact and machine readable format.

Referring to FIG. 5, a flow diagram 500 shows the method of the second embodiment.

A user sees content on a web page on the screen that she would like to query on and the user marks on the screen regions that contain the data she would like to query on. The marked area is received 501 at a system for generating queries.

The underlying DOM that is contained in the box is extracted 502 using an algorithm described below and this DOM is serialized to XML.

The XML derived of the drawn regions is converted 503 to a easy to read queries by the query formatter. This generates 504 textual instances with formatting and a text only instance 505 with no formatting.

The user may optionally add 506 contextual words in order to refine the query. The document containing the user's set of words can be passed through a "bag-of-words" filter 507.

The query generator module then generates 508 a query from the set of instances. The search engine searches 509 for pages/documents which contain or are similar to one of the instances and the result pages/documents are presented 510 to the user.

An example algorithm for extraction of a DOM tree given a selected area on web page is as follows. By the box selected on the screen, the web browser recognizes the text words selected and the HTML relationships among them. The relationship may be which pairs of words share the same HTML element, and which element it is (same title, same paragraph, same header, same link, etc.). Thus, the selected text words and the HTML elements they belong to, together define a subtree on the whole HTML DOM tree. The subtree is referred to as the twig query.

By configuration, the twig can be defined such that its root coincides with the root of the whole HTML document tree, or it can be rooted at the lowest common ancestor of the selected text words. Other options, which are all configurable, are a node in between, or a forest of little twigs rather than one twig.

As with the example above, laboratory tests can be indexed into a search engine repository, as XML documents. These can then be searched over, in order to retrieve documents that include, as sub document, a twig specified in the query. For example, using the example given above, <cell> <test> hemoglobin </test> <value> 9.2 </value> </cell> is a query (specifically, expressed in the XMLFragment query language) specifying a little twig, whose root node is 'cell', which has two children, 'test' and 'value'. The child 'test' must have a child the word 'hemoglobin' and the child 'value' must have a child the word 9.2. (Children in the DOM tree sense: the parent is an element name, and the child is a sub-element or a text word). Search engines, like IBM OmniFind, can retrieve only documents that include the twig thus specified. Now, XMLFragments allows more constraints to be added to the query, in addition to the twig. The query may consist of more than one twig, or a twig and a free text. For example, <cell> <test> hemoglobin </test> <value> 9.2 </value> </cell> AND "extreme fatigue"

Such a query specifies the constraint on the retrieved documents: they should include the twig as above, and, somewhere on the document, the phrase "extreme fatigue" should occur. If the search wants "extreme fatigue" to be strictly contextually related to the twig, and in a specified manner, the above extended query can be formed as above:

<lab-exams> <suspicious finding> extreme fatigue </suspicious finding> <cell> <test> hemoglobin </test> <value> 9.2 </value> </cell> </lab-exams>

A contextual query system may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A computer-implemented method for searching using contextual data, comprising:
capturing information selected by a user from a first document that is presented on a display, the information comprising first data captured from a first area of the display and including content that is considered by the user to be relevant to a target text of a second document and the information further comprising second data captured from a second area of the display and including a context of the first data, the context including hierarchical XML structures comprising at least one of a row, column, table, table heading and tag;
converting the first data and the second data to one or more extensible markup language (XML) representations of the content and the hierarchical XML structures;
providing hierarchical textual instances with formatting corresponding to the XML representations;
automatically generating a query for searching in a search engine for the textual instances, the query comprising a target textual representation of the textual instances and comprising the context and hierarchical XML structures in which the textual instances are found;
contextually modifying the query by addition of user-supplied words; and
executing the query to find text and context in the second document that contains or is similar to the target textual representation in the hierarchical XML structures of the query, wherein any of said steps are implemented in either of computer hardware or computer software and embodied in a non-transitory computer-readable medium.

2. The method as claimed in claim 1, including searching indexed hierarchical structures of documents together with the content.

3. The method as claimed in claim 1, wherein providing hierarchical textual instances translates logical terms of the XML representations to hypertext markup language (HTML) tags.

4. The method as claimed in claim 1, wherein providing hierarchical textual instances predicts HTML source fragments for the first data and the second data.

5. The method as claimed in claim 1, wherein the first area and the second area include respective indications of selection for content, context, or both.

6. The method as claimed in claim 1, wherein the first area and the second area are captured as an image, wherein providing hierarchical textual instances comprises executing an optical character recognition (OCR) process to extract text and coordinates and to estimate the hierarchical XML structures.

7. The method as claimed in claim 6, wherein the text and coordinates deduced by the OCR process are analyzed structurally to produce the XML representations.

8. The method as claimed in claim 1, wherein the first area and the second area are areas of web documents with HTML source and a web browser recognizes text words selected and HTML relationships among them.

9. The method as claimed in claim 1, wherein converting the first area and the second area includes extracting a Document Object Model (DOM) for the first data and the second data and serializing it to XML representations.

10. The method as claimed in claim 1, including additionally providing a textual instance of the first data and the second data without formatting for use as a query.

11. The method as claimed in claim 1, including providing user input to refine the textual instances with formatting.

12. The method as claimed in claim 1, including filtering the textual instances to remove unnecessary, misleading, or diverting words.

13. A computer program product for searching using contextual data, the computer program product comprising:
 a non-transitory computer readable medium;
 computer program instructions, which instructions, when executed by a computer, cause the computer to perform the steps of
 accepting captured information selected by a user from a first document that is presented on a display, the information comprising first data captured from a first area of the display and including content that is considered by the user to be relevant to a target text of a second document and the information further comprising second data captured from a second area of the display and including a context of the first data, the context including hierarchical XML structures comprising at least one of a row, column, table, table heading and tag;
 converting the first data and the second data to one or more extensible markup language (XML) representations of the content and the hierarchical XML structures;
 providing hierarchical textual instances with formatting corresponding to the XML representations;
 automatically generating a query for searching in a search engine for the textual instances, the query comprising a target textual representation of the textual instances and comprising the context and the hierarchical XML structures in which the textual instances are found;
 contextually modifying the query by addition of user-supplied words; and
 executing the query to find text and context in the second document that contains or is similar to the target textual representation in the hierarchical XML structures of the query.

14. A system for searching using contextual data, comprising:
 a processor;
 a receiver capturing information by a user from a first document that is presented on a display, the information comprising first data captured from a first area of the display and including content that is considered by the user to be relevant to a target text of a second document and the information further comprising second data captured from a second area of the display and including a context or structure of the first data, the context including hierarchical XML structures comprising at least one of a row, column, table, table heading and tag;
 a converter for converting the first data and the second data to one or more extensible markup language (XML) representations of the content and the hierarchical XML structures;
 a formatter for providing hierarchical textual instances with formatting corresponding to the XML representations;
 a query generator for generating a query, the query comprising a target textual representation of the textual instances and comprising the context and the hierarchical XML structures in which the textual instances are found, and contextually modifying the query by addition of user-supplied words; and
 a search engine for executing the query to find text and context in the second document that contains or is similar to the target textual representation in the hierarchical XML structures of the query, wherein any of said steps are implemented in either of computer hardware or computer software and embodied in a non-transitory computer-readable medium.

15. The system as claimed in claim 14, wherein the receiver includes a mechanism for indicating if the first area and the second area is selected for content, context, or both.

16. The system as claimed in claim 14, wherein the converter includes an optical character recognition (OCR) process for deducing text and coordinates for the first area and the second area when captured as an image.

17. The system as claimed in claim 16, wherein the converter includes a structure analyzer to produce XML representations of the first data and the second data.

18. The system as claimed in claim 14, wherein the formatter is operative for predicting hierarchical textual instances as hypertext markup language (HTML) source where no HTML source is available.

19. The system as claimed in claim 14, wherein the first area and the second area are areas of web documents with HTML source and a web browser recognizes text words selected and HTML relationships among the text words.

20. The system as claimed in claim 14, wherein the converter converts the first area and the second area by extracting a Document Object Model (DOM) for the first data and the second data and serializing the first data and the second data to XML representations.

21. The system as claimed in claim 14, wherein the formatter additionally provides a textual instance of the first data and the second data without formatting for use as the query.

22. The system as claimed in claim 14, including a user interface for providing user input to refine the textual instances with formatting.

23. The system as claimed in claim 14, including a filter for filtering the textual instances to remove unnecessary, misleading, or diverting words.

* * * * *